United States Patent [19]

Watanabe et al.

[11] 4,386,137

[45] May 31, 1983

[54] PROCESS FOR PRODUCING A GRAPHITE FLUORIDE TYPE FILM ON THE SURFACE OF AN ALUMINUM SUBSTRATE

[75] Inventors: Nobuatsu Watanabe, Nagaokakyo; Tsuyoshi Nakajima; Hiroaki Yamada, both of Kyoto; Noboru Ohsawa, Ibaraki, all of Japan

[73] Assignees: Nobuatsu Watanabe, Nagaokakyo; Applied Science Research Institute, Kyoto, both of Japan

[21] Appl. No.: 330,822

[22] Filed: Dec. 15, 1981

[30] Foreign Application Priority Data

| | | | |
|---|---|---|---|
| Sep. 10, 1981 | [JP] | Japan | 56-143005 |
| Sep. 10, 1981 | [JP] | Japan | 56-143006 |

[51] Int. Cl.$^3$ ........................ B32B 15/04; C23C 13/04

[52] U.S. Cl. .................................... 428/457; 427/249; 427/255; 427/255.2; 428/698

[58] Field of Search ..................... 427/255.2, 249, 255; 428/457, 698

[56] References Cited

U.S. PATENT DOCUMENTS

| | | | |
|---|---|---|---|
| 3,765,929 | 10/1973 | Martin | 427/249 |
| 3,911,194 | 10/1975 | Dejachy et al. | 427/255 |
| 4,188,426 | 2/1980 | Auerbach | 427/40 |

OTHER PUBLICATIONS

N. Watanabe, "Solid State Ionics", vol. 1, pp. 87–110 (1980), North-Holland Publishing Company.

*Primary Examiner*—Michael R. Lusignan
*Assistant Examiner*—Janyce A. Bell
*Attorney, Agent, or Firm*—Armstrong, Nikaido, Marmelstein & Kubovcik

[57] ABSTRACT

A process for producing a novel graphite fluoride type film on the surface of an aluminum substrate in which an aluminum substrate and a carbonaceous material or polycarbon monofluoride represented by the formula $(CF)_n$ are heated in an atmosphere of fluorine gas. The film has a luster, and not only exhibits high degree of hydrophobicity but also has corrosion resistance to aqueous solutions of acid and alkali as well as a mechanical strength.

20 Claims, 7 Drawing Figures

PROCESS FOR PRODUCING A GRAPHITE FLUORIDE TYPE FILM ON THE SURFACE OF AN ALUMINUM SUBSTRATE

This invention relates to a process for producing a graphite fluoride type film on the surface of an aluminum substrate. Most particularly, the present invention is concerned with a process for producing a graphite fluoride type film on the surface of an aluminum substrate which comprises heating an aluminum substrate and a carbonaceous material or polycarbon monofluoride represented by the formula $(CF)_n$ in an atmosphere of fluorine gas. The graphite fluoride type film on the surface of an aluminum substrate obtained by the process of the present invention is a film which is strongly, chemically bonded to the aluminum substrate and has a smooth surface of a color of gray through grayish black to black with luster. The film also has such an excellent property that the film not only exhibits strong water repellency and high insulating property, but also has high corrosion resistance to acid and alkaline solutions.

The present invention has been made based on the following novel findings. Illustratively stated, when an aluminum plate (more than 99.9% purity) and Monolon [trade name of $(CF)_n$ having a particle size of 200 mesh (Tyler) and a white color, and manufactured by Daikin Kogyo K.K. Japan], in a weight ratio of about 1:1, are heated at a temperature of 450° C. for 48 hours under a fluorine gas pressure of 1 atm using a rotary-type fluorinating apparatus provided with a mechanical seal, a gray uniform film with luster is formed on the surface of the aluminum plate (the plate with said film formed thereon is hereafter referred to as "Sample-A"). The film thus formed is so strongly bonded to the aluminum plate that the film does not come off even when the aluminum plate with the film was bent. The film thus obtained has an insulating property as high as $4\times10^{10}\Omega\cdot cm$ in terms of specific resistance and also has a corrosion resistance to acid and alkaline solutions. Such a film has been found to be extremely valuable in practical use. The contact angle of distilled water to the film is 122°, which angle is similar to the contact angle of distilled water to graphite fluoride represented by the formula $(CF)_n$. Further, when an aluminum plate (more than 99.9% purity) and flaky natural graphite produced in Madagascar and having a particle size of 16 to 60 mesh (Tyler), in a weight ratio of about 1:1, are heated at a temperature of 600° C. for 48 hours under a fluorine gas pressure of 1 atm using a rotary-type fluorinating apparatus provided with a mechanical seal, a gray uniform film with luster is formed on the surface of the aluminum plate (the plate with said film formed thereon is hereafter referred to as "Sample-E"). The film thus formed is so strongly bonded to the aluminum plate that the film does not come off even when the aluminum plate with the film was bent. The film thus obtained has an insulating property as high as $4\times10^{10}\Omega\cdot cm$ in terms of specific resistance and also has a corrosion resistance to acid and alkaline solutions. Such a film has been found to be extremely valuable in practical use. The contact angle of distilled water to the film is 120° C., which angle is similar to the contact angle of distilled water to graphite fluoride represented by the formula $(CF)_n$. The present invention has been made based on the above-mentioned findings.

Accordingly, it is an object of the present invention to provide a process for producing a graphite fluoride type film on the surface of an aluminum substrate or an aluminum alloy substrate, which film is strongly combined with said substrates and has a high mechanical strength and chemical inertness.

The foregoing and other objects, features and advantages of the present invention will be apparent to those skilled in the art from the following detailed description taken in connection with the accompanying drawings in which.

According to the present invention, there is provided a process for producing a graphite fluoride type film on the surface of an aluminum substrate which comprises heating an aluminum substrate and a carbonaceous material or polycarbon monofluoride represented by the formula $(CF)_n$ in an atmosphere of fluorine.

In order to elucidate the nature of the bonding between the aluminum substrate and the graphite fluoride type film obtained according to the present invention, studies have been made by using X-ray microanalysis, X-ray diffraction using $CuK_\alpha$ as a source of radiation and electron spectroscopy for chemical analysis (ESCA) using $MgK_\alpha$ as a source of radiation with respect to the above-mentioned sample-A.

Figure 1:
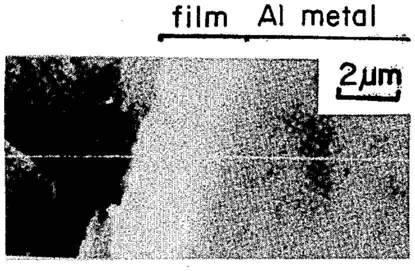
FIG. 1 is a scanning electron micrograph showing a cross-sectional view of an aluminum plate with a graphite fluoride type film thereon prepared according to one mode of the present invention (Sample-A)
Figure 2:
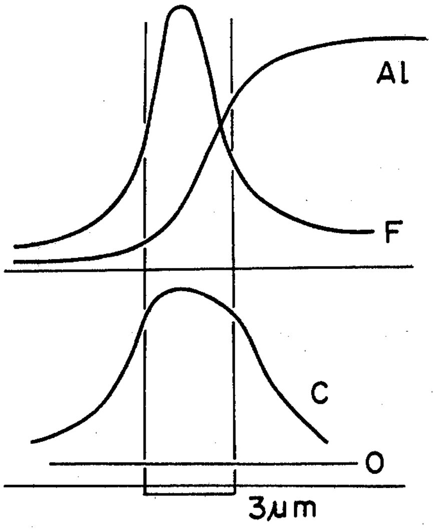
FIG. 2 shows line profiles for Al, F, C and O atoms in the graphite fluoride type film of FIG. 1 obtained by means of X-ray microanalysis taken along the horizontal straight line in FIG. 1.

The scanning electron micrograph in FIG. 1 shows the cross section of the film, from which the thickness of the film has been found to be about 3 to 4 μm. The horizontal straight line in FIG. 1 is to indicate the direction along which X-ray microanalysis was carried out. FIG. 2 shows line profiles for Al, F, C and O atoms obtained by means of X-ray microanalysis taken substantially along the thicknesswise direction of the film, that is, along the horizontal straight line in FIG. 1. The right side in FIG. 2 is the aluminum substrate side, and the region between two vertical straight lines corresponds to the film. As is apparent from FIG. 2, the aluminum concentration decreases rapidly from the film/aluminum substrate interface to the film surface. The contents of fluorine and carbon were about 50% in number of atom and about 30% in number of atom respectively, but almost no oxygen was observed.

Figure 3:
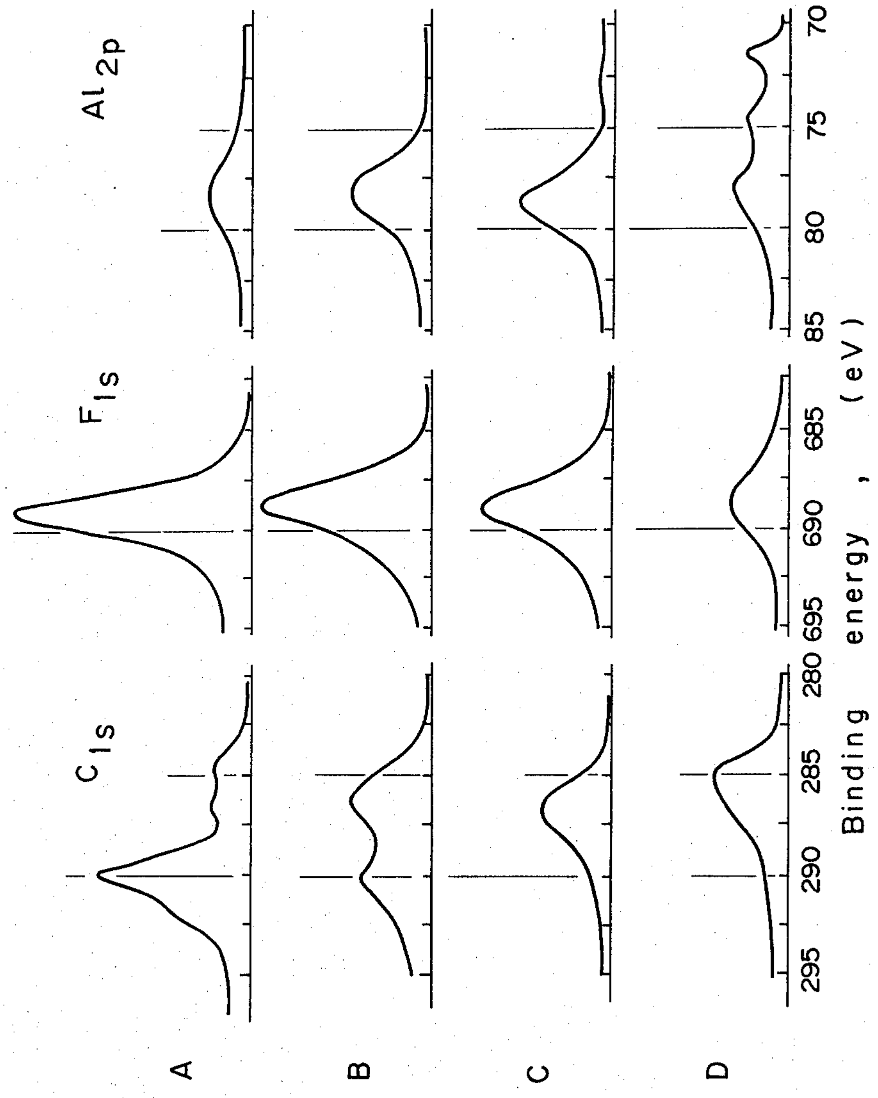
FIG. 3 shows ESCA spectra for $C_{1s}$, $F_{1s}$ and $Al_{2p}$ electrons in the graphite fluoride type film of FIG. 1.

FIG. 3 shows the ESCA spectra for $C_{1s}$, $F_{1s}$ and $Al_{2p}$ electrons of the film. In FIG. 3, the row indicated by A shows ESCA spectra for $C_{1s}$, $F_{1s}$ and $Al_{2p}$ electrons with respect to Sample-A having an entire surface film; the row indicated by B shows ESCA spectra for $C_{1s}$, $F_{1s}$ and $Al_{2p}$ electrons with respect to Sample-B which has been prepared by subjecting the film of Sample-A to sandpaper-abrasion; the row indicated by C shows ESCA spectra for $C_{1s}$, $F_{1s}$ and $Al_{2p}$ electrons with respect to Sample-C which has been prepared by subjecting the film of Sample-B to sandpaper-abrasion; and the row indicated by D shows ESCA spectra for $C_{1s}$, $F_{1s}$ and $Al_{2p}$ electrons with respect to Sample-D which has been prepared by subjecting the film of Sample-C to sandpaper-abrasion so that the aluminum surface has almost appeared. Each peak was corrected with respect to that for contaminant carbon is electron located at 285.0 eV. As is apparent from the ESCA spectra with respect to Sample-A having the entire surface film, $C_{1s}$ and $F_{1s}$ electrons emitted from the surface film gave their peaks at 290±0.2 eV and 689±0.2 eV, respectively, which peaks originate from $(CF)_n$. The peak for $Al_{2p}$ located at 78.5±0.2 eV suggests that aluminum atom is bonded to fluorine or fluorocarbon. With respect to Sample-B and Sample-C which have been subjected to sandpaper-abrasion, $C_{1s}$ peak at 290±0.2 eV decreased rapidly and another $C_{1s}$ peak at 286.5±0.2 eV appeared. This fact is characteristic of the film according to the present invention, and suggests that there is formed a chemical bond Al—C—F in the film at its film/aluminum substrate interface. This view is supported by the fact that the reaction product of aluminum carbide ($Al_4C_3$) with fluorine has a $C_{1s}$ peak at the same position (286.5±0.2 eV). In the ESCA spectra for $Al_{2p}$ taken near the film/aluminum substrate interface (Sample-D), peaks due to metallic aluminum and aluminum oxide were observed at 71.5±0.2 eV and 74.5±0.2 eV, respectively.

X-ray diffraction study indicated the presence of $\alpha$-$AlF_3$ and $\gamma$-$AlF_3$ in the film of Sample-A. No graphite fluoride could be detected. This is probably because the crystalline graphite fluoride layer is too thin to be detected or graphite fluoride is in an amorphous state.

Anyhow, it should be noted that the produced film according to the present invention exhibits a distilled water contact angle of about 120° C., which is as large as that of graphite fluoride represented by the formula $(CF)_n$.

With respect to the aforementioned Sample-E having a surface film produced by a process comprising heating aluminum substrate and flaky natural graphite in an atmosphere of fluorine gas, studies have been made by using X-ray microanalysis, X-ray diffraction using $CuK_\alpha$ as a source of radiation and electron spectroscopy for chemical analysis (ESCA) using $MgK_\alpha$ as a source of radiation.

The scanning electron micrograph of Sample-E shows that the thickness of the film is about 3 to 4 $\mu$m. Line profiles for Al, F, C and O atoms obtained by means of X-ray microanalysis taken substantially along the thicknesswise direction of the film shows that the aluminum concentration decreases rapidly from the film/aluminum substrate interface to the film surface. The contents of fluorine and carbon were about 50% in number of atom and about 30% in number of atom, respectively, but almost no oxygen was observed.

ESCA spectra for $C_{1s}$, $F_{1s}$ and $Al_{2p}$ electrons of the film were obtained. With respect to the ESCA spectra of Sample-E having an entire surface film, $C_{1s}$ and $F_{1s}$ electrons emitted from the surface film gave their peaks at 290±0.2 eV and 689±0.2 eV, respectively, which peaks originate from $(CF)_n$. The peak for $Al_{2p}$ located at 78.5±0.2 eV suggests that aluminum atom is bonded to fluorine or fluorocarbon. With respect to Sample-F which has been prepared by subjecting the film of Sample-E to sandpaper-abrasion, $C_{1s}$ peak at 290±0.2 eV decreased rapidly and another $C_{1s}$ peak at 286.5±0.2 eV appeared. This is the same fact as that observed with respect to Sample-A, and characteristic of the film according to the present invention. The above suggests that there is formed a chemical bond Al—C—F in the film at its film/aluminum substrate interface. As is described before, this view is supported by the fact that the reaction product of aluminum carbide ($Al_4C_3$) with fluorine has a $C_{1s}$ peak at the same position (286.5±0.2 eV). Sample-G has been prepared by subjecting the film of Sample-F to sandpaper-abrasion so that the aluminum surface has almost appeared. In the ESCA spectra for $Al_{2p}$ taken near the film/aluminum substrate interface, that is, in the ESCA spectra for $Al_{2p}$ with respect to Sample-G, peaks due to metallic aluminum and aluminum oxide were observed at 71.5±0.2 eV and 74.5±0.2 eV, respectively. X-ray diffraction study indicated the presence of $\alpha$-$AlF_3$ in the film of Sample-E. No graphite fluoride could be detected. This is probably because the crystalline graphite fluoride layer is too thin to be detected or graphite fluoride is in an amorphous state. This distilled water contact angle of Sample-E was as large as 120°, which is substantially the same as that of graphite fluoride represented by the formula $(CF)_n$. The process according to the present invention will now be described in detail.

As a substrate on which the graphite fluoride type film is formed, there may be employed substantially pure aluminum or an aluminum alloy composed mainly of aluminum. For example, there may be employed an aluminum alloy containing 2–3% by weight of magnesium.

As the carbonaceous material to be used in the process of the present invention, there may be employed either a graphite material having crystalline structure or an amorphous carbonaceous material such as petroleum coke. The graphite material may be a natural graphite material or an artificial graphite material such as pyrolytic graphite obtained by subjecting an amorphous carbonaceous material such as petroleum coke to heat treatment at high temperatures.

Polycarbon monofluoride represented by the formula $(CF)_n$ to be used in this invention may be commercially available products such as the above-mentioned Monolon or graphite fluoride obtained by heating natural graphite, artificial graphite or petroleum coke in an atmosphere of fluorine at a temperature of about 500° C. or more.

In practicing the process of the present invention, the heating conditions somewhat vary depending on whether the heating is conducted while allowing the aluminum substrate and the carbonaceous material or polycarbon monofluoride represented by the formula $(CF)_n$ to be in a stationary state or to be rotated. In the former case, the heating is carried out at a temperature of 450° to 600° C. for 12 to 90 hours under a fluorine gas pressure of 0.01 to 0.5 atm. In the later case, the heating is carried out at a temperature of 450° to 600° C. for 4 to 90 hours under a fluorine gas pressure of 0.1 to 1 atm. From the viewpoint of easiness of effecting uniform reaction, it is preferred that the heating be carried out while allowing the reaction system to be rotated.

In case polycarbon monofluoride represented by the formula $(CF)_n$ is used, the graphite fluoride is caused to decompose by the heating, and there can be obtained the film having the above-mentioned chemical bond Al—C—F in the film at its film/aluminum substrate interface.

The following Examples are given to illustrate the present invention in more detail, but should not be construed to be limiting the scope of the invention.

EXAMPLES 1 TO 5

After degreasing an aluminum plate (more than 99.9% purity), the aluminum plate and Monolon [trade name of $(CF)_n$ manufactured by Daikin Kogyo K.K., Japan] of which the weight amount was almost equal to that of the aluminum plate were charged and mixed in a stationary type fluorinating apparatus. Then, a fluorine gas was introduced into the fluorinating apparatus and the reaction was conducted by heating to obtain a desired film on the aluminum plate. The reaction conditions and the characteristics of the obtained films are shown in Table 1.

TABLE 1

| | Reaction conditions | | | Characteristics of obtained film | | | |
|---|---|---|---|---|---|---|---|
| Example No. | Temperature (°C.) | Time (hr) | Fluorine gas pressure (atm) | Distilled water contact angle (°) | Specific resistance (Ω · cm) | Uniformity of film | Color |
| 1 | 500 | 47 | 0.5 | 110 | $>10^{10}$ | uniform | black |
| 2 | 500 | 75 | 0.5 | 112 | $>10^{10}$ | almost uniform | black |
| 3 | 500 | 66 | 0.2 | 112 | $>10^{10}$ | uniform | black |
| 4 | 500 | 73 | 0.1 | 114 | $>10^{10}$ | uniform | black |
| 5 | 510 | 48 | 0.15 | 116 | $>10^{10}$ | uniform | black |

Figure 4:
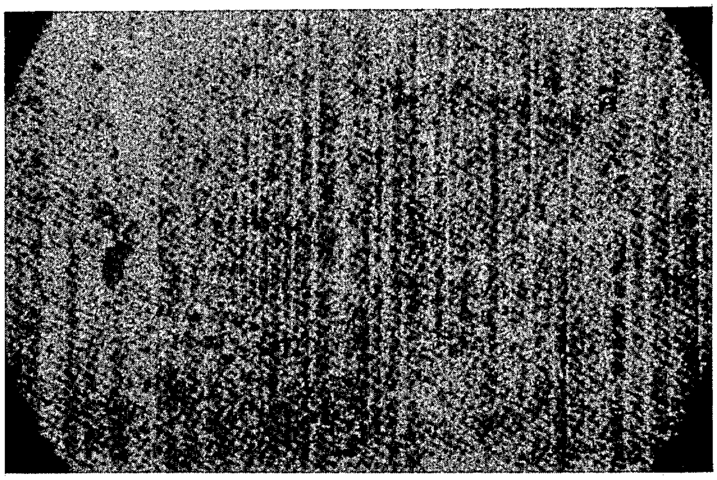
FIG. 4 is the microphotograph of the film obtained in Example 4 which will be given later.

The microphotograph (×100) of the film obtained in Example 4 is shown in FIG. 4.

EXAMPLES 6 AND 7

In substantially the same manner as in Example 1 except that a rotary-type fluorinating apparatus with a mechanical seal was employed instead of the stationary type fluorinating apparatus, the reaction were conducted to obtain a desired film on the aluminum plate. The reaction conditions and the characteristics of the obtained films are shown in Table 2.

TABLE 2

| | Reaction conditions | | | Characteristics of obtained film | | | |
|---|---|---|---|---|---|---|---|
| Experiment No. | Temperature (°C.) | Time (hr) | Fluorine gas pressure (atm) | Water contact angle (°) | Specific resistance (Ω · cm) | Uniformity of film | Color |
| 6 | 450 | 48 | 1 | 122 | $4 \times 10^{10}$ | uniform | gray |
| 7 | 500 | 24 | 1 | 110 | $4 \times 10^{10}$ | uniform | black |

Figure 5:
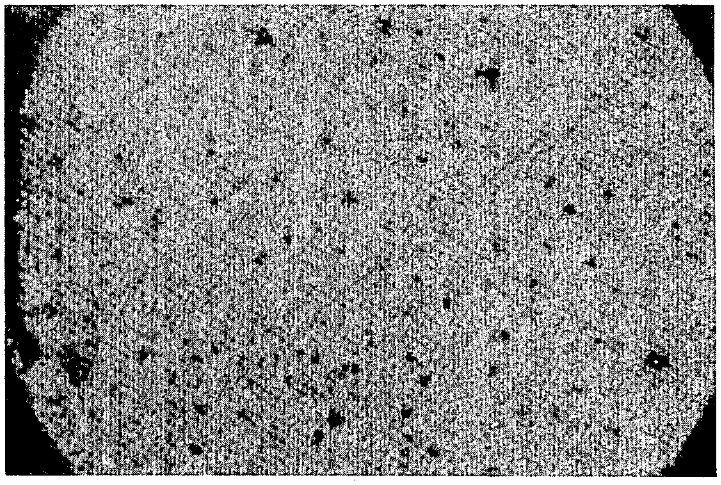
FIG. 5 is the microphotograph of the film obtained in Example 6 which will be given later.

The microphotograph (×100) of the film obtained in Example 6 is shown in FIG. 5.

EXAMPLE 8

In substantially the same manner as in Example 1 except that a miniature reacting tube (stationary type) was used instead of the stationary type fluorinating apparatus and a flaky $(CF)_n$ obtained by reacting petroleum coke with fluorine at 600° C. for 43 hours was used instead of Monolon, the reaction was conducted to obtain a desired film on the aluminum plate. The reaction conditions and the characteristics of the obtained film are shown in Table 3.

EXAMPLE 9

Figure 7:
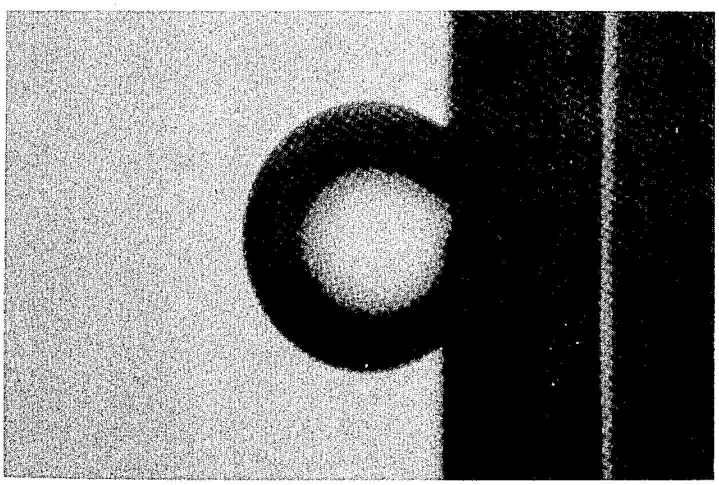
FIG. 7 is the microphotograph demonstrating the water contact angle to the film obtained in Example 9 which will be given later.
Figure 6:
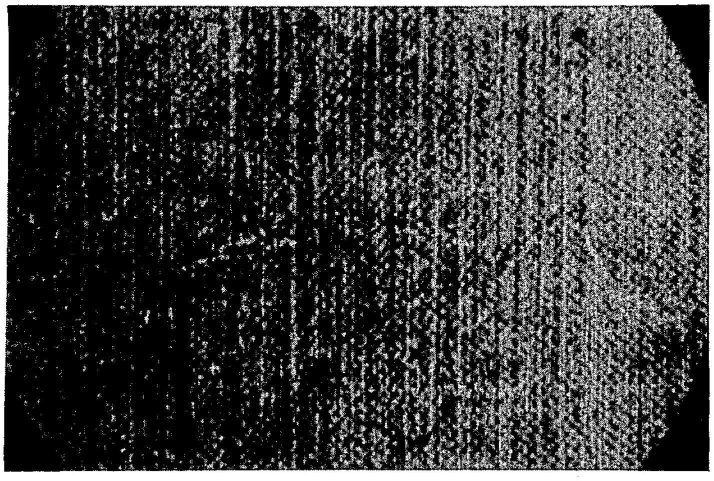
FIG. 6 is the microphotograph of the film obtained in Example 9 which will be given later.

In substantially the same manner as in Example 1 except that a miniature reacting tube (stationary type) was employed instead of the stationary type fluorinating apparatus, the reaction was conducted to obtain a desired film on the aluminum plate. The reaction conditions and the characteristics of the obtained film are shown in Table 3. The microphotograph (×100) of the film and the microphotograph demonstrating the distilled water contact angle to the film (120°) are shown in FIG. 6 and FIG. 7, respectively.

TABLE 3

| | Reaction conditions | | | Characteristics of obtained film | | | |
|---|---|---|---|---|---|---|---|
| Experiment No. | Temperature (°C.) | Time (hr) | Fluorine gas pressure (atm) | Distilled water contact angle (°) | Specific resistance (Ω · cm) | Uniformity of film | Color |
| 8 | 500 | 44 | 0.5 | 114 | $>10^{10}$ | uniform | gray |
| 9 | 500 | 90 | 0.5 | 120 | $>10^{10}$ | uniform | grayish black |

EXAMPLE 10

A degreased aluminum plate (more than 99.9% purity) and flaky natural graphite from Madagascar ore having a particle size of 16 to 60 mesh of which the weight amount was almost equal to that of the aluminum plate were charged in a nickel-made vessel and the vessel were charged in a rotary type fluorinating apparatus having a nickel-made inner wall. The reaction was conducted at 600° C. for 48 hours while flowing a fluorine gas (more than 98% purity) from which HF had been removed by means of NaF pellets through the rotary type fluorinating apparatus under a pressure of 1 atm and at a rate of 3 to 5 ml/min.

The speed of rotation of the rotary type fluorinating apparatus was 2 rpm. The film on the aluminum plate thus obtained had a thickness of 4 μm, a distilled water contact angle of 120° and a specific resistance of $4\times10^{10}$ Ω·cm.

EXAMPLE 11

The reaction was conducted in substantially the same manner as in Example 10 except that the fluorine gas was enclosed in the rotary type fluorinating apparatus under a pressure of 1 atm instead of flowing fluorine gas through the apparatus. There was obtained a desired film on the aluminum plate. The film thus obtained had a thickness of 3 μm, a distilled water contact angle of 120° and a specific resistance of $4\times10^{10}$ Ω·cm.

EXAMPLE 12

An aluminum alloy plate including 2.2 to 2.8% by weight of Mg [under JIS (Japanese Industrial Standard) 5052] and flaky natural graphite from Madagascar ore having a particle size of 16 to 60 mesh of which the weight amount was almost equal to that of the aluminum alloy plate were charged in a nickel-made vessel and the vessel were put in a rotary type fluorinating apparatus having nickel-made inner wall. The reaction was conducted at 550° C. for 72 hours while flowing a fluorine gas (more than 98% purity) from which HF had been removed by means of NaF pellets into the rotary type fluorinating apparatus under a pressure of 1 atm and at a rate of 3 to 5 ml/min. The rotation of the rotary type fluorinating apparatus was effected at 2 rpm. There was obtained a desired film on the aluminum alloy plate. The film thus obtained had a thickness of 3 μm, a distilled water contact angle of 113° and a specific resistance of $4\times10^{10}$ Ω·cm.

EXAMPLE 13

An degreased aluminum plate (more than 99.9% purity) and powdery petroleum coke of which the weight amount was almost equal to that of the aluminum plate were charged in a nickel-made vessel and the vessel was put in a rotary type fluorinating apparatus. A fluorine gas (more than 98% purity) from which HF had been removed by means of NaF pellets was enclosed in the rotary type fluorinating apparatus under a pressure of 1 atm. The reaction was conducted at 600° C. for 48 hours while effecting rotation of the rotary type fluorinating apparatus at 2 rpm. There was obtained a desired film on the aluminum plate. The film thus obtained had a thickness of 4 μm, a distilled water contact angle of 120° and a specific resistance of $4\times10^{10}$ Ω·cm.

The films with luster obtained in Examples 1 through 13 had an excellent resistance to acids and alkalis and were so strongly combined with the aluminum substrates that any of the films did not come off even when the aluminum plate or aluminum alloy plate was bent.

The product with the graphite fluoride type film obtained by the process of the present invention is useful as a material not only for kitchen room appliances but also for ship-building, house-building, etc.

What is claimed is:

1. A process for producing a graphite fluoride type film on the surface of an aluminum substrate which comprises heating an aluminum substrate and a carbonaceous material or polycarbon monofluoride represented by the formula $(CF)_n$ at a temperature of 450° to 600° C. for 12 to 90 hours under gas fluorine at a gas pressure of 0.01 to 0.5 atm while allowing said aluminum substrate and said carbonaceous material or polycarbon monofluoride to be in a stationary state.

2. A process according to claim 1, wherein said aluminum substrate is a substantially pure aluminum metal.

3. A process according to claim 1, wherein said aluminum substrate is an aluminum alloy composed mainly of aluminum.

4. A process according to claim 1, wherein said carbonaceous material is a graphite material.

5. A process according to claim 1, wherein said carbonaceous material is an amorphous carbonaceous material.

6. A process for producing a graphite fluoride type film on the surface of an aluminum substrate which comprises heating an aluminum substrate and a carbonaceous material or polycarbon monofluoride represented by the formula $(CF)_n$ at a temperature of 450° to 600° C. for 4 to 90 hours under gas fluorine at a gas pressure of 0.1 to 1 atm while rotating said aluminum substrate and said carbonaceous material or polycarbon monofluoride.

7. A process according to claim 6, wherein said aluminum substrate is a substantially pure aluminum metal.

8. A process according to claim 6, wherein said aluminum substrate is an aluminum alloy composed mainly of aluminum.

9. A process according to claim 6, wherein said carbonaceous material is a graphite material.

10. A process according to claim 6, wherein said carbonaceous material is an amorphous carbonaceous material.

11. A product produced by the process of claim 1.

12. A product produced by the process of claim 2.

13. A product produced by the process of claim 2.

14. A product produced by the process of claim 4.

15. A product produced by the process of claim 5.

16. A product produced by the process of claim 6.

17. A product produced by the process of claim 7.

18. A product produced by the process of claim 8.

19. A product produced by the process of claim 9.

20. A product produced by the process of claim 10.

* * * * *